United States Patent [19]

Kanda

[11] Patent Number: 4,884,150
[45] Date of Patent: Nov. 28, 1989

[54] INFORMATION REPRODUCER

[75] Inventor: Masao Kanda, Saitama, Japan

[73] Assignee: Pioneer Electronic Corporation, Tokyo, Japan

[21] Appl. No.: 145,956

[22] Filed: Jan. 20, 1988

[30] Foreign Application Priority Data

Jan. 20, 1987 [JP] Japan .................................. 62-10941

[51] Int. Cl.[4] .............................................. H04N 9/87
[52] U.S. Cl. .................................................... 358/327
[58] Field of Search ............... 358/310, 312, 314, 320, 358/325, 326, 327, 313, 335, 336, 337, 339, 340; 360/10.1, 10.3, 36.2, 38.1

[56] References Cited

U.S. PATENT DOCUMENTS

| | | | |
|---|---|---|---|
| 4,555,734 | 11/1985 | Fukui | 358/337 |
| 4,635,134 | 6/1987 | Sasamura et al. | 358/314 |
| 4,680,658 | 7/1987 | Tatami | 358/339 |
| 4,682,251 | 7/1987 | Hirota et al. | 358/340 |
| 4,736,238 | 4/1988 | Moriyama et al. | 358/314 |
| 4,783,703 | 11/1988 | Murakoshi et al. | 358/336 |
| 4,788,601 | 11/1988 | Kawasaki | 358/336 |

Primary Examiner—Donald McElheny, Jr.
Attorney, Agent, or Firm—Sughrue, Mion, Zinn, Macpeak & Seas

[57] ABSTRACT

A video signal reproducing system including a still picture reproduction function is provided with correction circuitry for preventing the line jitter problem which often occurs in conventional units. A memory circuit is provided which has a capacity of at least one field, and receives a video input via a variable delay circuit. The output is derived, in alternate fields, from the memory circuit or a correction circuit. In one embodiment, the correction circuit may deliver a line interpolated signal derived by averaging the memory output signal and a 1-H delayed signal from the memory circuit.

11 Claims, 4 Drawing Sheets

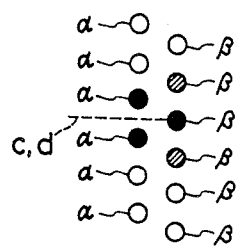
FIG. 2
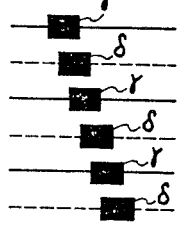
FIG. 3 (A) PRIOR ART
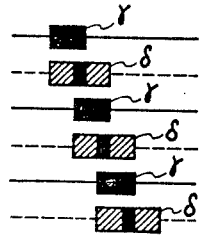
FIG. 3 (B) PRIOR ART
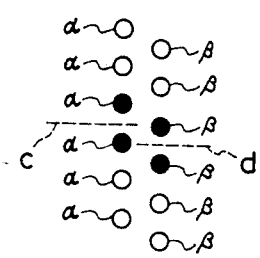
FIG. 6 PRIOR ART
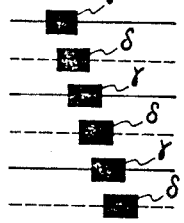
FIG. 7 (A) PRIOR ART
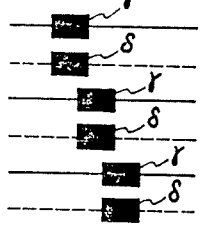
FIG. 7 (B) PRIOR ART

INFORMATION REPRODUCER

BACKGROUND OF THE INVENTION

The present invention relates to an apparatus for reproducing video information recorded on a recording medium such as a recording disk.

FIG. 5 shows a conventional information reproducer in which an RF (high frequency) signal including video information read from a recording disk 2 through a pickup 1 is supplied to a demodulation circuit 3 made of an FM demodulator and so forth. A video signal is demodulated by the demodulation circuit 3 and then supplied to an A/D converter 4 and a synchronizing signal separation circuit 5 which separates horizontal and vertical synchronizing signals from the video signal. The horizontal synchronizing signal sent out from the synchronizing signal separation circuit 5 is supplied to a phase comparison circuit 6 and a writing clock signal generation circuit 9. In the phase comparison circuit 6, the phase of the horizontal synchronizing signal and that of a reference signal r sent out from a quartz oscillator or the like (not shown in the drawing) and having a prescribed frequency are compared with each other so that a phase difference detection signal corresponding to the difference between the phases of the compared signals is generated. The phase difference detection signal is supplied as a spindle error signal to a servo-amplifier 7. A spindle motor 8 for rotating the recording disk 2 is supplied with the output from the servo-amplifier 7 so that the rotary speed of the recording disk is controlled. The writing clock signal generation circuit 9 generates clock pulses synchronized with the horizontal synchronizing signal. The clock pulse sent out from the writing clock signal generation circuit 9 is supplied as a sampling pulse to the A/D converter 4 and as a writing command signal to a variable delay circuit 10. In the A/D converter 4, the video signal is sampled through the use of the clock pulse so that a digital signal corresponding to a value obtained by the sampling is generated. The digital signal is supplied from the A/D converter 4 to the variable delay circuit 10 to which reading clock pulses sent out from a reading clock signal generation circuit 11 and having a prescribed frequency are supplied as a reading command signal. For example, the variable delay circuit 10 is made of a first-in first-out memory so that input data are sequentially written into the memory in accordance with the writing command signal and the written data are sequentially read from the memory in the order of writing, in accordance with the reading command signal. In the variable delay circuit 10, the signal delay time for the input data is changed depending on the time-axis error, to correct the error. The output data from the variable delay circuit 10 are supplied to a memory 12 to which address data and a mode control signal are supplied from a memory controller 13. The reading clock pulses and a still picture reproduction command signal a sent out from a control unit (not shown in the drawing) are supplied to the memory controller 13. The memory controller 13 sends out the mode control signal and the address data so that data are sequentially written into the memory 12 and the written data are sequentially read therefrom in the order of writing, in accordance with the reading clock pulses, when the still picture reproduction command signal a is not present; and such that the data written in the memory 12 are sequentially read therefrom in accordance with the reading clock pulses when the still picture reproduction command signal a is present. The data read from the memory 12 are supplied to a D/A converter 14 in which the data are sequentially converted into analog signals through the use of the reading clock pulses. The analog signals are sent out as reproduced video signals from the D/A converter 14.

When the still picture reproduction command signal is not sent out from the control unit, namely, when the signal is not present, the video signals sent out from the demodulation circuit 3 are written into the memory 12 through the A/D converter 4 and the variable delay circuit 10 and thereafter sequentially read from the memory in the order of writing so that the information recorded on the recording disk 2 is sequentially reproduced in the order of the reading of the information from the disk.

When the still picture reproduction command signal is sent out from the control panel, namely, when the signal is present, the data written in the memory 12 are repeatedly read therefrom as the contents of the memory are not rewritten, so that a still picture is reproduced.

If the memory 12 has the capacity to store data corresponding to one frame of video signals, the cost of the memory is high and the still picture reproduced by repeatedly reading the data (one frame of video signals) is distorted. For this reason, the memory 12 actually has the capacity to store an amount of data corresponding to one field of video signals. As a result, the mutually corresponding portions of the regions made by the scanning lines of the first and the second fields which form the still picture in the conventional information reproducer are the same as each other in the luminance and so forth. Therefore, the portions $\alpha$ which belong to the region made by the plural scanning lines of the first field and which intersect a prescribed vertical line, and portions $\beta$ which belong to the region made by the plural scanning lines of the second field and which intersect the vertical line, have luminances as shown in FIG. 6, and the center c of the picture formed by the first field and that d of the picture made by the second field do not coincide with each other. For this reason, the conventional information reproducer has a drawback in that half-line-interval vertical jitter is caused.

When an oblique line should be reproduced as shown in FIG. 7(A), a still picture reproduced from video signals read from the recording disk 2 and thereafter sent out from the D/A converter 14 becomes conspicuously zigzagged as shown in FIG. 7(B), where the $\gamma$'s are portions of a region made by the scanning lines of a first field (shown by solid lines) and the $\delta$'s are portions of a region made by the scanning lines of a second field (shown by dashed lines). This is another drawback of the conventional information reproducer.

In order to eliminate the above-mentioned drawbacks, it has been considered to provide a 1-H delay line which functions to delay data read from the memory 12 by one horizontal scanning period in the conventional information reproducer. Data obtained by calculating the average of the instantaneous value of the input to the 1-H delay line and the output therefrom would be supplied to the D/A converter 14 instead of the data read from the memory 12, in every other field. However, since the 1-H delay line is expensive, there is still a drawback in that the cost of production of the conventional information reproducer increases.

SUMMARY OF THE INVENTION

The present invention has been made in order to eliminate all the above-mentioned drawbacks.

Accordingly, it is an object of the present invention to provide an inexpensive information reproducer capable of reproducing a still picture of good quality.

The information reproducer comprises a variable delay means whose signal delay time is changed depending on the frequency of a control input so as to perform time-axis correction and a memory for storing a video signal subjected to the time-axis correction. When the still picture is reproduced, the video signal read from the memory is supplied to the variable delay means and a signal of prescribed frequency is supplied as the control input to the variable delay means at the same time as the video signal so that the video signal read from the memory is subjected to correction processing by the video signal delayed by a prescribed time in the variable delay means. Since the variable delay means is jointly used for the time-axis correction and picture quality correction, a still picture of good quality is reproduced via a simple construction.

BRIEF DESCRIPTION OF THE DRAWINGS

FIG. 2 shows the luminance values of mutually corresponding portions of regions made by the scanning lines of first and second fields of a still picture reproduced by the information reproducer;

FIGS. 3(A) +3(B) show the luminance of an oblique line reproduced as a still picture by the information reproducer;

FIG. 6 shows the luminance values of mutually corresponding portions of regions made by the scanning lines of first and second fields of a still picture reproduced by the conventional information producer; and FIGS. 7(A) +7(B) show the luminance of an oblique line reproduced as a still picture by the conventional information reproducer.

DETAILED DESCRIPTION OF THE EXEMPLARY EMBODIMENTS

Embodiments of the present invention, which are information reproducers, are hereafter described with reference to the drawings attached hereto.

Figure 1:
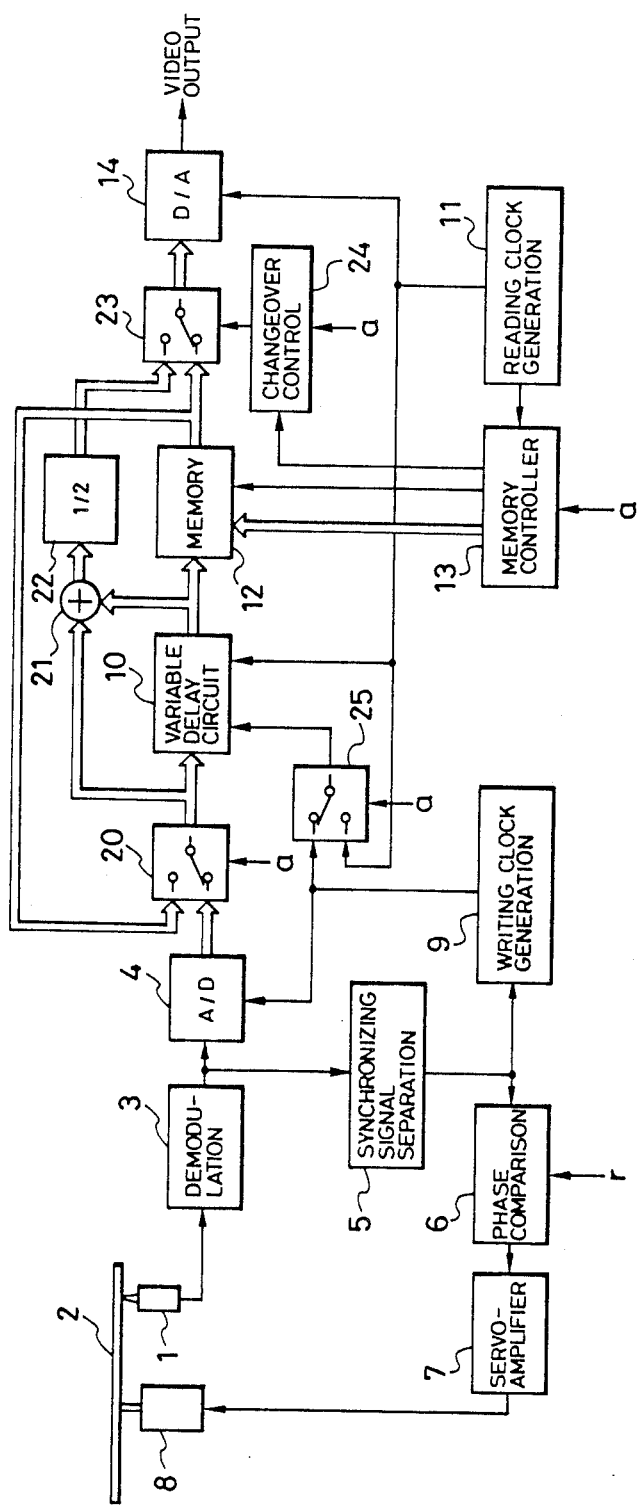
FIG. 1 is a block diagram of an information reproducer according to an embodiment of the present invention.

FIG. 1 is a block diagram of one information reproducer of the invention. Illustrated is a pickup 1, a recording disk 2, a demodulation circuit 3, an A/D converter 4, a synchronizing signal separation circuit 5, a phase comparison circuit 6, a servo-amplifier 7, a spindle motor 8, a writing clock signal generation circuit 9, a memory 12 and a memory controller 13 all of which are related to each other in the same manner as in the conventional information reproducer shown in FIG. 5. However, output data from the A/D converter 4 are supplied to one input terminal of a changeover switch 20. Data read from the memory 12 are supplied to the other input terminal of the changeover switch 20. A still picture reproduction command signal a is supplied from a control unit (which is not shown in the drawings) to the control input terminal of the changeover switch 20. When the still picture reproduction command signal is present, the data read from the memory 12 are selectively sent out from the changeover switch 20 to a variable delay circuit 10. When the still picture reproduction command signal is not present, the output data from the A/D converter 4 are selectively sent out from the changeover switch to the variable delay circuit 10.

The output data from the changeover switch 20 are also supplied to an addition circuit 21 which adds the output data with that from the variable delay circuit 10. The output data from the addition circuit 21 are supplied to a multiplication circuit 22 so that the output data are multiplied by $\frac{1}{2}$. The output data from the multiplication circuit 22 are supplied to one input terminal of a changeover switch 23. The data read from the memory 12 are supplied to the other input terminal of the changeover switch 23. A changeover command signal is supplied from the changeover control circuit 24 to the changeover switch 23. When the changeover command signal is present, the output from the multiplication circuit 22 is selectively sent out from the changeover switch 23. When the changeover command signal is not present, the data read from the memory 12 are selectively sent out from the changeover switch 23. For example, the changeover control circuit 24 may be made of a T-type flip-flop, which receives a pulse generated by the memory controller 13 every time an amount of data which corresponds to one field is read from the memory 12 at its clock signal input terminal, and the still picture reproduction command signal a sent from the control unit at its reset input terminal. When the still picture reproduction command signal a is present, the output of the changeover command signal is alternately started or stopped by the changeover control circuit 24 each time there elapses a time corresponding to the period at which an amount of data which corresponds to one field is read from the memory 12.

Writing clock pulses sent out from a writing clock signal generation circuit 9 are supplied to the A/D converter 4 and to one input terminal of a changeover switch 25. Reading clock pulses are supplied to the other input terminal of the changeover switch 25. The still picture reproduction command signal a is supplied to the control input terminal of the changeover switch 25. When the still picture reproduction command signal a is present, the reading clock pulses are selectively sent out from the changeover switch 25. When the still picture reproduction command signal a is not present, the writing clock pulses are selectively sent out from the changeover switch 25. The output pulses from the changeover switch 25 are supplied as a writing command signal to the variable delay circuit 10.

Figure 5:
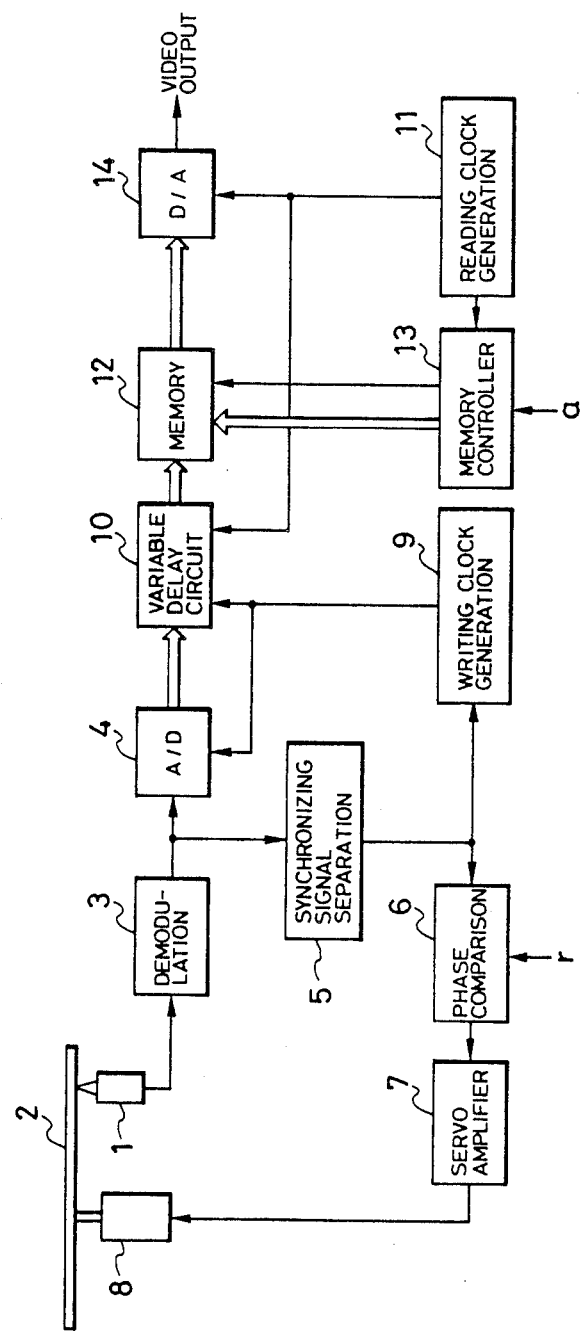
FIG. 5 is a block diagram of a conventional information reproducer.

When the still picture reproduction command signal a is not present, video signals sent out from the demodulation circuit 3 are sequentially written into the memory 12 through the A/D converter 4 and the variable delay circuit 10, as in the conventional information reproducer shown in FIG. 5, so that the contents of the memory are rewritten. The data written in the memory 12 are sequentially read therefrom in the order of the writing of the data therein and sent out through a D/A converter 14.

When the still picture reproduction command signal a is generated for example by manipulating a key on the control unit, the data written in the memory 12 are repeatedly read therefrom without rewriting the contents of the memory. The data read from the memory 12 are selectively supplied to the variable delay circuit 10. At the same time, the reading clock pulses are supplied as the writing command signal to the variable delay circuit 10 instead of the writing clock pulses so that the signal delay time in the variable delay circuit is fixed. If the signal delay time is set to be equal to one horizontal scanning period, the level of the output from the multiplication circuit 22 becomes equal to the mean value of the levels of the output data from the memory 12 and those obtained by delaying the output data from the memory. Since the output data from the multiplication circuit 22 are supplied to the D/A converter 14 during every other field, the mutually corresponding portions of regions generated by the scanning lines of the first and the second fields in the reproduced still picture have luminances as shown in FIG. 2, so that the center c of the picture created by the first field and that d of the picture created by the second field coincide with each other. For this reason, half-line-interval vertical jitter is not caused.

When an oblique line should be reproduced as shown in FIG. 3(A), a still picture reproduced from video signals read from the recording disk 2 and thereafter sent out from the D/A converter 14 does not have a conspicuously zigzagging line, as shown in FIG. 3(B), where the γ's are portions of a region made by the scanning lines of the first field (shown by solid lines) and the δ's are portions of a region made by the scanning lines of the second field (shown by dashed lines).

Figure 4:
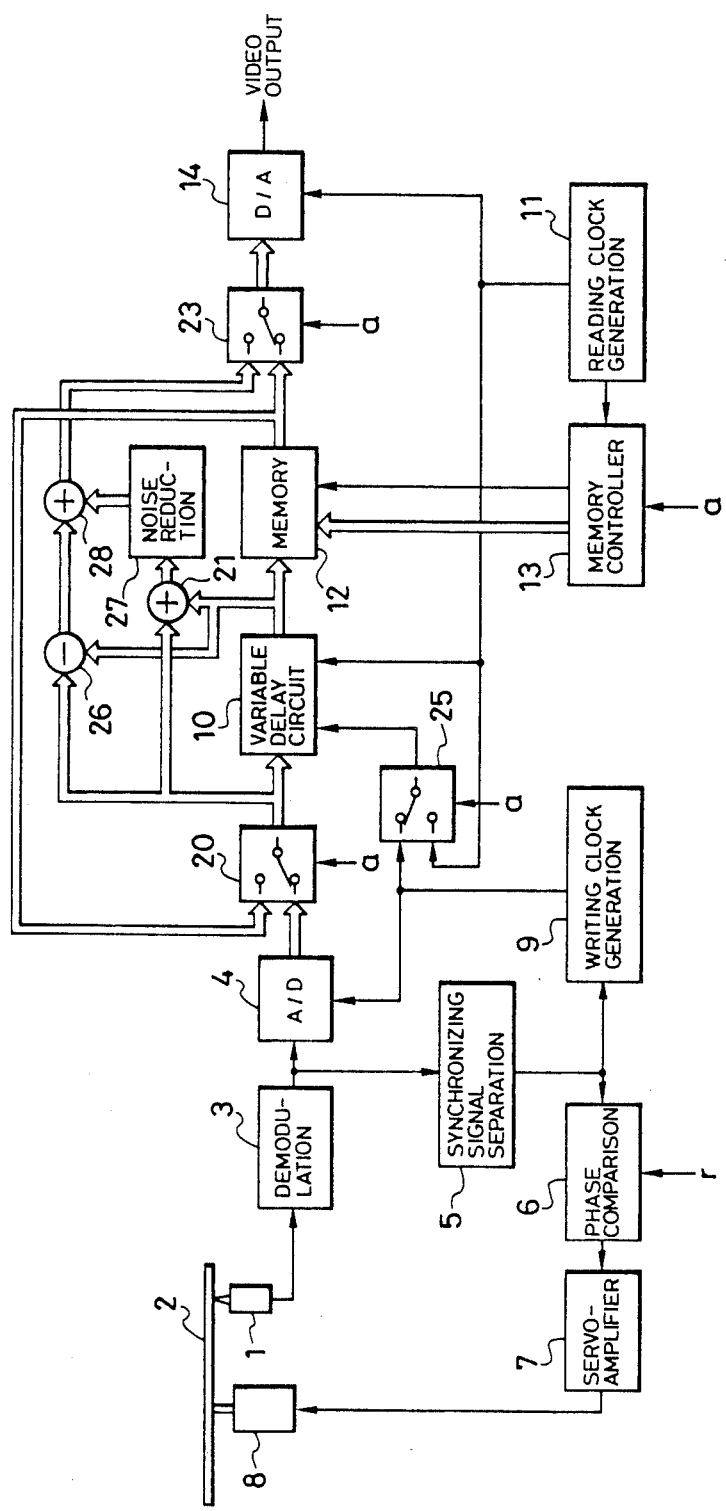
FIG. 4 is a block diagram of an information reproducer of another embodiment of the present invention.

FIG. 4 is a block diagram of an information reproducer of another embodiment. The pickup 1, recording disk 2, demodulation circuit 3, A/D converter 4, synchronizing signal separation circuit 5, phase comparison circuit 6, servo-amplifier 7, spindle motor 8, writing clock signal generation circuit 9, variable delay circuit 10, reading clock signal generation circuit 11, memory 12, memory controller 13, D/A converter 14, changeover switches 20, 23 and 25 and addition circuit 21 are related to each other in the same manner as in the information reproducer shown in FIG. 1. However, in the information reproducer shown in FIG. 4, the output from the changeover switch 20 and that from the variable delay circuit 10 are supplied to the addition circuit 21 and a subtraction circuit 26. Output data from the addition circuit 21 are supplied to a noise reduction circuit 27. For example, the noise reduction circuit may be a digital filter for the removal of a high-frequency band. Noise is removed by the noise reduction circuit 27, the output data from which are supplied to an addition circuit 28 to add the output data to that from the subtraction circuit 26. The output from the addition circuit 28 is supplied to one input terminal of the changeover switch 23. A still picture reproduction command signal a is supplied to the control input terminal of the changeover switch 23. When the still picture reproduction command signal a is present, the output data from the addition circuit 28 are selectively sent out from the changeover switch 23. When the still picture reproduction command signal a is not present, data read from the memory 12 are selectively sent out from the changeover switch 23.

When the still picture reproduction command signal a is not present in the information reproducer shown in FIG. 4, video signals sent out from the demodulation circuit 3 are sequentially written into the memory 12 through the A/D converter 4 and the variable delay circuit 10 in the same manner as in the information reproducer shown in FIG. 1, so that the contents of the memory are rewritten. The data written in the memory 12 are sequentially read therefrom in the order of writing and sent out through the D/A converter 14.

When the still picture reproduction command signal a is generated for example by manipulating a key on the control unit, the data written in the memory 12 are repeatedly read therefrom without rewriting the contents of the memory. The data read from the memory 12 are selectively supplied to the variable delay circuit 10. At the same time, reading clock pulses are supplied as a writing command signal, instead of writing clock pulses, to the variable delay circuit 10, so that the signal delay time in the variable delay circuit is fixed. If the signal delay time is set to be equal to one horizontal scanning period, the variable delay circuit 10, the addition circuit 21 and the subtraction circuit 26 act as a comb filter such that the luminance signal is separated and sent out from the addition circuit 21 and the chrominance signal is separated and sent out from the subtraction circuit 26. The luminance signal is supplied to the noise reduction circuit 27 to remove spurious noise. The luminance signal is thereafter supplied to the addition circuit 28 so that the luminance signal is added back to the chrominance signal to generate data corresponding to the video signal. The output data from the addition circuit 28 are selectively sent out from the changeover switch 23 to the D/A converter 14. As a result, a good still picture without noise is reproduced.

Although the variable delay circuit 10 in each of the above-described embodiments is a digital delay circuit, the present invention is not confined thereto but may be otherwise embodied so that an analog delay circuit such as a charge coupled device is provided as a variable delay circuit.

What is claimed is:

1. An information reproducer of the type in which video information recorded on a recording medium is read therefrom and reproduced, comprising; first timing signal generation means for generating a first timing signal corresponding to the time-axis error of a video signal obtained from said recording medium; variable delay means for delaying an input signal by a time determined by a control input; second timing signal generation means for generating a second timing signal for causing said variable delay means to act as a fixed delay line; memory means for storing an output from said variable delay means in accordance with a command signal and capable of storing an amount of data corresponding to at least one field; first signal selection means for selectively supplying one of a signal read from said memory and said video signal read from said recording medium to said variable delay means; second signal selection means for selectively supplying one of said first and second timing signals as said control input to said variable delay means in accordance with said command signal and correction means for processing said signal read from said memory, using the output from said variable delay means, in response to said command signal, so as to improve the quality of a picture reproduced from said signal read from said memory.

2. An information reproducer according to claim 1, wherein said correction means includes means for performing line interpolation at the time of the reproduction of a still picture.

3. An information reproducer according to claim 2, wherein said correction means comprises adder means for combining the outputs of said first signal selection means and said variable delay means; and multiplier means for halving the output of said adder means.

4. An information reproducer according to claim 3, further comprising a third signal selection means having an output coupled to a video output terminal, a first input coupled to an output of said memory, and a second input coupled to an output of said multiplier means.

5. An information reproducer according to claim 1, wherein said correction means includes means for performing luminance-chrominance separation and recombination at the time of the reproduction of a still picture.

6. An information reproducer according to claim 5, wherein said correction means comprises adder means for combining the outputs of said first signal selection means and said variable delay means; subtractor means for differencing said outputs of said first signal selection means and said variable delay means, noise reduction means coupled to an output of said adder means, and second adder means for combining the outputs of said subtractor means and said noise reduction means.

7. An information reproducer according to claim 6, further comprising a third signal selection means having an output coupled to a video output terminal, a first input coupled to an output of said memory, and a second input coupled to an output of said adder means.

8. An information reproducer according to claim 7, further comprising a third signal selection means having an output coupled to a video output terminal, a first input coupled to an output of said memory, and a second input coupled to an output of said correction means, further including changeover control means for switching said third signal selection means at intervals corresponding to a field period.

9. An information reproducer according to claim 1, further comprising a third signal selection means having an output coupled to a video output terminal, a first input coupled to an output of said memory, and a second input coupled to an output of said correction means.

10. An information reproducer according to claim 9, further comprising a third signal selection means having an output coupled to a video output terminal, a first input coupled to an output of said memory, and a second input coupled to an output of said correction means, further including changeover control means for switching said third signal selection means at intervals corresponding to a field period.

11. An information reproducer according to claim 1, wherein the delay time of said variable delay means is fixed at one horizontal line delay in response to said second timing signal.

* * * * *